Oct. 18, 1949.  P. KANE  2,485,001
WIRE TYING BALER
Filed April 17, 1944  2 Sheets-Sheet 2
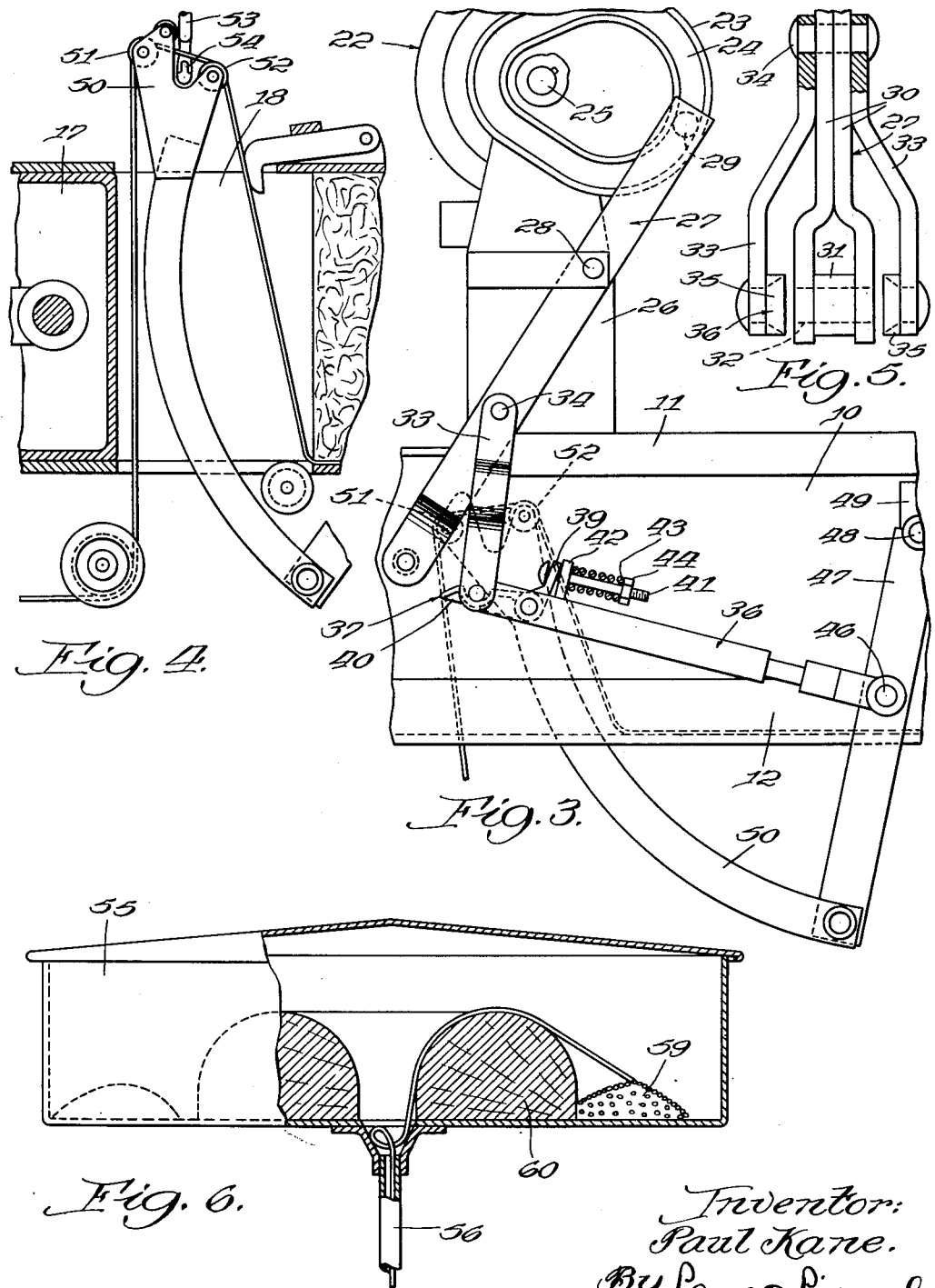

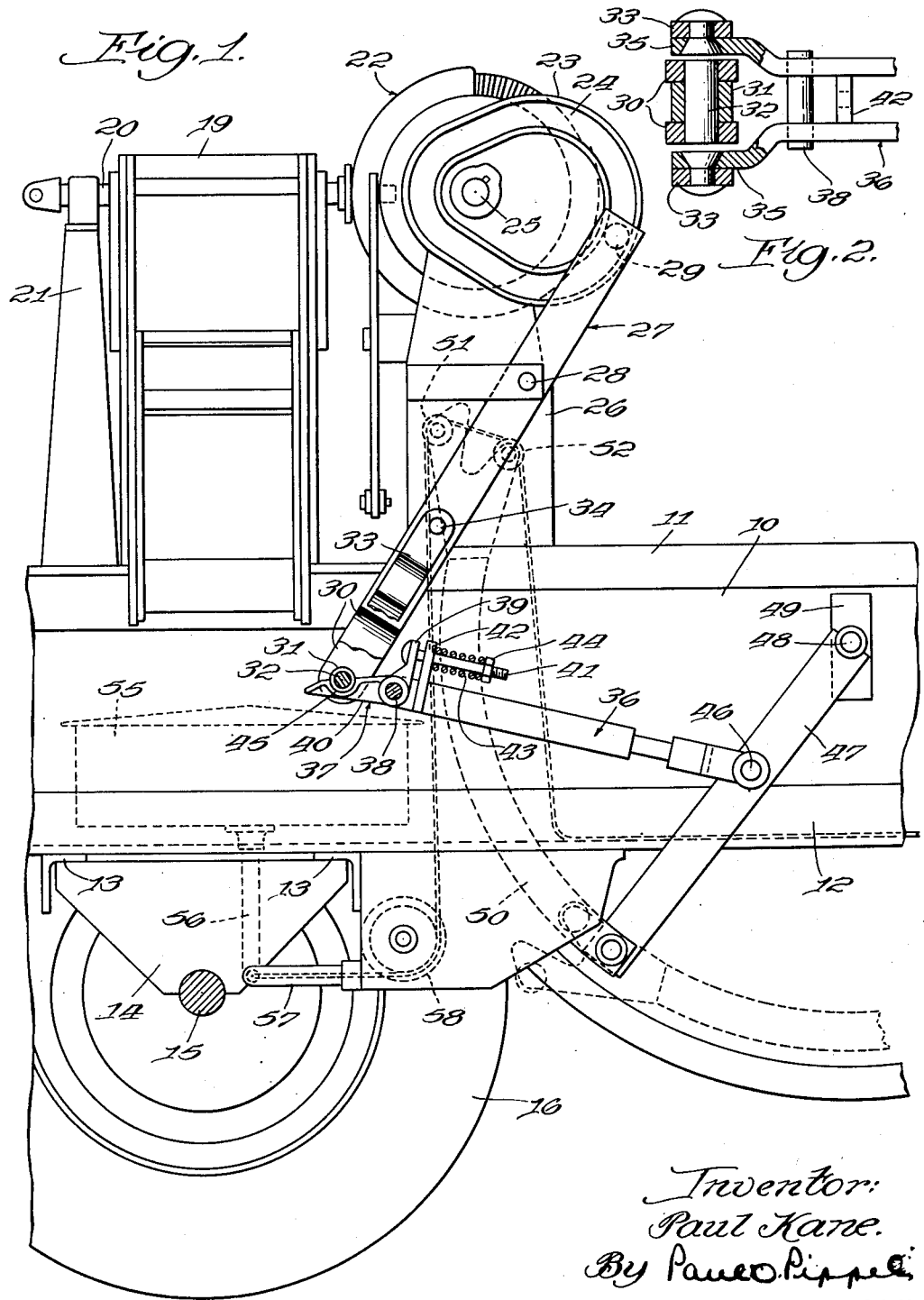

Patented Oct. 18, 1949

2,485,001

UNITED STATES PATENT OFFICE 2,485,001

WIRE TYING BALER

Paul Kane, Chicago, Ill., assignor to International Harvester Company, a corporation of New Jersey Application April 17, 1944, Serial No. 531,363

5 Claims. (Cl. 100—20)

This invention relates to a baler. More specifically, it relates to a wire-feeding mechanism associated with a tie-forming device for a baler. The trend in agricultural implements has been to perform crop-gathering and treating operations in as few steps as possible and directly in the field to avoid the necessity for transporting and rehandling of the crop material. In the case of balers such as hay compressors, machines have been developed which pick up the hay or other material directly from the windrow in the field and carry on the baling operation during traveling of the machine across the field. One problem still remaining with this type of baler is the necessity of manually feeding and tying the wires or other ties used around the bales. To solve this problem and complete the mechanization of the baling process, both tie-assist and completely automatic tying balers have been developed which feed the wire or other tying strand around the bale, eliminating all or a large part of the manual labor required for tying bales. The Pearson Patent 1,321,548 illustrates a baling press in which an associating arcuate needle is utilized to bring the tying wire into position around the end of the bale.

Various features of a side feed pick-up baler utilizing wire-carrying needles operable from the bottom of the bale chamber to feed the wire for the ties to a loop-forming mechanism above the bale chamber are disclaimed and claimed in copending application Serial No. 466,461, filed November 21, 1942, which issued on August 10, 1948, as Patent No. 2,446,878. The present invention has to do with an improvement in a tie-assist baler as shown in said application, although the invention may be utilized on any baler having a positively driven strand or wire-carrying mechanism.

The principal object of the present invention is to provide a releasable mechanism in a power train to interrupt or discontinue the transmission of power to a needle-carrying strand of high tensile strength when the strand becomes caught or encounters a resistance which might cause damage to the mechanism or break the strand. A more specific object is to provide a release mechanism for wire-carrying means for balers in which the mechanism is automatically reengageable during each cycle of operation of the operating mechanism. The above objects and others which will be apparent from the detailed description to follow are attained in a mechanism such as illustrated in the drawings, in which:

Figure 1 is an elevational view showing a portion of a bale chamber with its associated mechanism and a wire-carrying needle with its operating mechanism;

Figure 2 is a bottom view partly in horizontal section, showing the certain elements of the latch mechanism;

Figure 3 shows a portion of the needle operating mechanism of Figure 1 in released position;

Figure 4 is a vertical longitudinal section through the bale chamber to illustrate the wire-carrying operation of the needle;

Figure 5 is an end elevation of a portion of the latch elements shown in Figures 1 and 3; and Figure 6 is an enlarged detail partly in section, showing a wire-carrying means and a possible source of kinking of the wire.

The drawings show only such parts of a baler as are necessary to illustrate the invention. Balers of the hay press type are very well known in the art. These presses usually incorporate a feeding mechanism to feed the hay into the baling chamber, a plunger mechanism to press the hay, and a block setting device. The sides of the bale chamber of the conventional type are usually open for the insertion of wires which are usually manually tied. As above noted, the release mechanism of this invention is particularly adapted to the construction shown in Patent 2,446,878, which shows the complete baler mechanism including the feeding means and the loop-forming means on the tying mechanism.

A bale chamber 10, formed by upper angle bar frame members 11 and lower angle bar frame members 12, may be a part of any baler construction using any type of feeding and compressing mechanism. As the baler illustrated is adapted to be utilized as a mobile unit, the frame structure of the baling chamber is supported on transverse angle bars 13, a bracket 14, and an axle 15 which carries pneumatic tired wheels, one of which, 16, is shown.

As best shown in Figure 4, a compressing plunger 17 advances into the baling chamber to compress the material therein, which in this construction is delivered through a side feed opening 18. In a side feed baler, the upper and lower portions of the bale chamber are free, which is a decided advantage in the use of an automatic or semi-automatic tying mechanism.

A portion of a feeding mechanism 19 is shown diagrammatically in Figure 1, it being understood that any suitable feed device may be utilized. A power input shaft 20 supported on a pedestal 21 mounted on the baling chamber frame supplies power to a tie-forming mechanism 22 also illustrated somewhat diagrammatically. Said mechanism is completely disclosed and covered by claims in the patent referred to, which shows complete details of a baler of this type. The tie-forming mechanism includes a member 23 having a cam slot 24, said member being rotated when the baler is in operation by a driving shaft 25. Said shaft, along with other parts of the mechanism, is carried by an upstanding structure 26 secured to the top of the bale chamber.

A power transmitting lever 27 pivoted at 28 on the structure 26 carries a member 29 slidable in the cam slot 24. The rotation of the shaft 25 carries the member 23 in an eccentric path, whereby the lever 27 is oscillated from the position shown in Figure 1 to a position substantially 45° thereto.

The lever 27 may be made up entirely, or its lower end only, of two adjacent flat bar members 30, as best shown in Figures 2 and 5. Said members are spaced apart at their lower ends to receive a roller 31 which is rotatably mounted on a pin 32 extending through openings in the spaced ends of the members 30.

A pair of links 33 is pivoted on a pin 34 to the members 30 at a point spaced a substantial distance upwardly from the roller 31. Said links diverge outwardly at their lower ends to provide a clearance space for pivotal connection with bifurcated ends 35 of a link 36. The ends 35 are spaced apart, as shown in Figure 2, to provide for the pivotal mounting of a latch member 37. Said latch member is pivoted on a transverse pin 38 and is provided with an upwardly extending arm 39 and a forwardly extending arm 40. The upwardly extending arm is provided with an opening through which a tie bolt 41 extends. Said bolt also extends through an opening in an upstanding bracket member 42 secured to the link 36 between the bifurcated ends. A compression spring 43 surrounds said bolt being held in place against the bracket 42 by an adjustable nut 44.

The forwardly projecting arm 40 of the latch member is provided with a substantial semicylindrical notch 45 of substantially the same radius as the roller 31 and being in a position to be engageable with said roller.

The link 36 is pivotally connected by a pin 46 with a lever arm 47 intermediate its ends. The upper end of the lever arm is pivotally connected to the bale chamber by means of a stub shaft 48 carried by a bracket 49.

In the showing only one lever arm 47 has been illustrated, and only one needle for carrying the tie-forming strand is feasible. It will be understood that two or more needles may be utilized, preferably two.

The lever arm 47 is rigidly connected at its lower end to an arcuate needle 50. Said needle is curved with its center about the stub shaft 48, whereby all portions follow the same path during insertion into the bale chamber, the full extent of which is illustrated in Figure 4 in full lines and in Figure 1 in dotted lines. The upper end of the needle 50 carries a pair of sheaves 51 and 52 which are adapted to engage and carry a wire or strand of other material upwardly into the bale chamber at the completion of the compression of sufficient material for a bale. A hook 53 having an engaging prong 54 at its lower end is illustrated in a position to engage the strand used for forming bale ties when the needle is in its uppermost position, as illustrated in Figure 4. The mechanism for forming a loop on the wire, severing the wire and holding the loose end for formation of a tie for the next bale to be formed, is illustrated in the application referred to. Other mechanism of the tie-assist or completely automatic tying type may be used, it being the feature of this invention to provide a mechanism for releasing positive pulling force on the tying strand.

In Figure 6 and in dotted lines in Figure 1, a wire-holding receptacle 55 is illustrated, said receptacle being connected by a tube 56 through which the tying strand is delivered to the needle and associated mechanism. Figure 1 further illustrates a continuation 57 of the conduit 56 which leads to a spool or sheave 58 from which the wire engages the sheave 51 on the needle. The wire-carrying receptacle 55 shows a coil of wire 59 from which wire is fed over a doughnut-shaped member 60, which has a smooth surface in order to feed the wire to the tubular conduit 56 with the least possibility of forming a knot or kink. In spite, however, of the most careful handling of the wire and the best design of feeding means, kinks occasionally occur in the wire such as illustrated in Figure 6. A knot or obstruction is then formed which binds the wire against passage through the conduit. When a resistance to wire of this type is encountered, the next upward movement of travel of the needle, which moves into the baling chamber from the lower side thereof in an upward direction, engages the wire with the result that either the wire must break or the needle mechanism must bend or break. To overcome this danger and damage to the mechanism, in addition to the problem of rethreading the machine brought about by breakage of the wire, the latch mechanism as above described has been provided as the essential feature of this invention. By selecting the proper size spring 43 and by adjusting the compression thereon, the exact tension in the wire can be determined which will trip the latch mechanism and release the link 36, as shown in Figure 3, thereby stopping the supply of power for actuating the needle and its rockable lever arm 47. As the cam member 23 continues its cycle of operation, the lever 27 is moved back into the position shown in Figure 1, with the roller 31 riding up the cammed end of the arm 40 of the latch member again engaging the latch member with the roller. As the cycle of operation continues, forces are again applied to the needle to lift the wire into the position shown in Figure 4. If the obstruction still remains in the path of the wire, the unlatching will again occur and will continue until the wire is free to move from the holder. If it is necessary to manually remove the kink or obstruction from the wire, the operator may do so, in many instances, without stopping the baler mechanism. In any event, the wire will not be broken and rethreading will not be required, it only being necessary to locate and remove whatever may be interfering with the paying out of the wire. Moreover, in any event, it will not be necessary to reset the needle-actuating mechanism as it automatically engages and sets itself on each cycle of operation of the power-transmitting mechanism.

It is to be understood that applicant has shown and described only a preferred embodiment of his improved release mechanism for a baler wire-feeding means, and that he claims as his invention all similar constructions and modifications coming under the scope of the appended claims.

What is claimed is:

1. In a baling mechanism having a bale chamber with an associated frame structure and reciprocating means for compressing hay in said chamber, a bale tie-forming means including means for holding a coil of wire, a lever arm mounted on the baling chamber for oscillatory motion, an arcuate wire-carrying needle mounted on the end of said arm in a position to be moved into and through the bale chamber by oscillation of the arm, means for supplying wire from said coil to said needle, driving mechanism for said needle including a lever mounted for oscillation on the frame structure of the baling chamber, a swingable link pivoted to said lever spaced from the lower end thereof, a member pivotally connected to said link at one end and pivotally secured to the lever arm at the other end for oscillating said lever arm, and a spring-loaded latch member carried by said member, said latch member being releasably engageable with a portion of the lever whereby when a predetermined tension is reached on the wire due to kinking or other abnormal resistance, the latch will release thereby preventing breaking of the wire and damage to the mechanism.

2. In a baler having a bale chamber and reciprocating means for compressing hay in said chamber, a bale tie-forming means including means for holding a coil of wire, a lever arm mounted on the baling chamber for oscillatory motion, an arcuate wire-carrying needle mounted on the end of said arm in a position to be moved into and through the bale chamber by oscillation of the arm, means for supplying wire from said coil to said needle, and driving mechanism for said needle including a lever mounted for oscillation on the bale chamber, a roller carried by said lever at the lower end thereof, a pair of swingable links pivoted to said lever spaced from the lower end thereof, a bifurcated member pivotally connected to said links at one end and pivotally secured to the lever arm at the other end for oscillating said arm, and a spring-loaded latch member pivotally mounted between the bifurcated ends of said member, said latch member having a notch therein releasably engageable with said roller whereby when a predetermined tension is reached on the wire due to kinking or other abnormal resistance, the latch will release thereby preventing breaking of the wire and damage to the mechanism.

3. In a baler having a bale chamber with an associated frame structure and reciprocating means for compressing hay in said chamber, a bale tie-forming means including means for holding a coil of wire, a lever arm mounted on the baling chamber for oscillatory motion, an arcuate wire-carrying needle mounted on the end of said arm in a position to be moved into and through the bale chamber by oscillation of the arm, means for supplying wire from said coil to said needle, and driving mechanism for said needle including a power input lever mounted for oscillation on the frame structure of the baling chamber, a roller carried by said lever at the lower end thereof, a pair of swingable links pivoted to said lever spaced from the lower end thereof, a bifurcated member pivotally connected to said links at one end and pivotally secured to the lever arm at the other end for oscillating said lever arm, and a spring-loaded latch member pivotally mounted between the bifurcated ends of said member, said latch member having a notch therein releasably engageable with said roller whereby when a predetermined tension is reached on the wire due to kinking or other abnormal resistance, the latch will release thereby preventing breaking of the wire, said links providing for continuous movement of the power input lever and for automatic re-engagement of the latch means on each cycle of operation.

4. In a baling mechanism having a bale chamber with an associated frame structure and reciprocating means for compressing hay in said chamber, a bale tie-forming means including means for holding a supply of tie-strand, a lever arm mounted on the bale chamber for oscillatory motion, an arcuate tie-strand carrying needle mounted on the end of said arm in a position to be moved into and through the bale chamber by oscillation of the arm, means for delivering tie-strand from said supply to said needle, driving mechanism for said needle including a lever mounted for oscillation on the frame structure associated with the bale chamber, a swingable link pivoted to said lever, a member pivotally connected to said link at one end and pivotally secured to the lever arm at the other end for oscillating said lever arm, and a spring-loaded latch member carried by said member, said latch member being releasably engageable with a portion of the lever whereby when a predetermined tension is reached on the tie-strand, the latch will release thereby preventing breaking of the tie-strand and damage to the mechanism.

5. In a baler having a bale chamber with an associated frame structure and reciprocating means for compressing hay in said chamber, a bale tie-forming means including means for holding a supply of tie-strand, a lever arm mounted on the bale chamber for oscillatory motion, an arcuate tie-strand carrying needle mounted on the end of said arm in a position to be moved into and through the bale chamber by oscillation of the arm, means for delivering tie-strand from said supply to said needle, and driving mechanism for said needle including a power input lever mounted for oscillation on the frame structure associated with the bale chamber, a roller carried by said lever at the lower end thereof, a pair of swingable links pivoted to said lever spaced from the lower end thereof, a bifurcated member pivotally connected to said links at one end and pivotally secured to the lever arm at the other end for oscillating said lever arm, and a spring-loaded latch member pivotally mounted between the bifurcated ends of said chamber, said latch member having a notch therein releasably engageable with said roller whereby when a predetermined tension is reached on the tie-strand, the latch will release thereby preventing breaking of the tie-strand, said links providing for continuous movement of the power input lever and for automatic reengagement of the latch means on each cycle of operation.

PAUL KANE.

REFERENCES CITED

The following references are of record in the file of this patent:

UNITED STATES PATENTS

| Number | Name | Date |
|---|---|---|
| 1,075,376 | Pearson et al. | Oct. 14, 1913 |
| 1,321,548 | Pearson | Nov. 11, 1919 |
| 1,775,810 | Clark | Sept. 16, 1930 |
| 2,361,742 | Bunn | Oct. 31, 1944 |
| 2,446,876 | Kaupke et al. | Aug. 10, 1948 |